United States Patent [19]

Redpath et al.

[11] Patent Number: 5,990,887
[45] Date of Patent: Nov. 23, 1999

[54] METHOD AND SYSTEM FOR EFFICIENT NETWORK DESIRABLE CHAT FEEDBACK OVER A COMMUNICATION NETWORK

[75] Inventors: Richard J. Redpath, Cary; Gennaro Cuomo, Apex, both of N.C.

[73] Assignee: International Business Machines Corp., Armonk, N.Y.

[21] Appl. No.: 08/961,379

[22] Filed: Oct. 30, 1997

[51] Int. Cl.⁶ .................................................. G06F 13/00
[52] U.S. Cl. ..................... 345/330; 707/501; 395/200.34; 345/332
[58] Field of Search .................................. 345/329, 330, 345/331, 332; 707/501, 513; 395/200.34, 200.35

[56] References Cited

U.S. PATENT DOCUMENTS

| | | | |
|---|---|---|---|
| 5,550,968 | 8/1996 | Miller et al. | 345/332 |
| 5,761,683 | 6/1998 | Logan et al. | 707/513 |
| 5,764,916 | 6/1998 | Busey et al. | 707/501 |
| 5,784,568 | 7/1998 | Needham | 345/330 |
| 5,828,839 | 10/1998 | Moncreiff | 395/200.34 |

*Primary Examiner*—Raymond J. Bayerl
*Assistant Examiner*—Chadwick A. Jackson
*Attorney, Agent, or Firm*—A. Bruce Clay

[57] ABSTRACT

In an Internet chat environment, chat feedback indicators show receiver users of a chat application that at least one sender is in the process of preparing a message for viewing by chat environment participants. As a sender types text, a length of the text is sent to the receivers via unreliable data packets. Thus, the receivers are shown mask characters that correspond to the number of textual entries mede by the sender. The sender is, therefore, provided with some sense of security in that the typed text will not be displayed to the receivers until complete. In addition, the receivers are provided with an indication that something is being prepared for display to them.

12 Claims, 7 Drawing Sheets

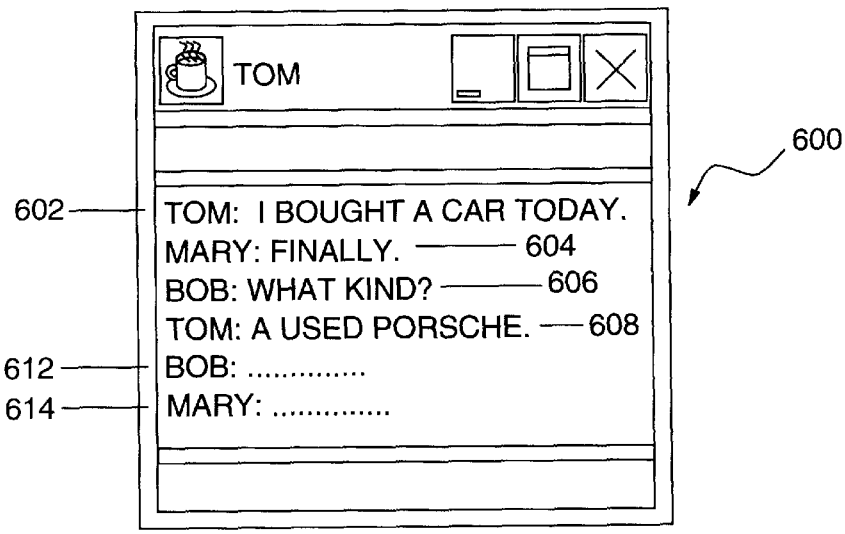
FIGURE 6A
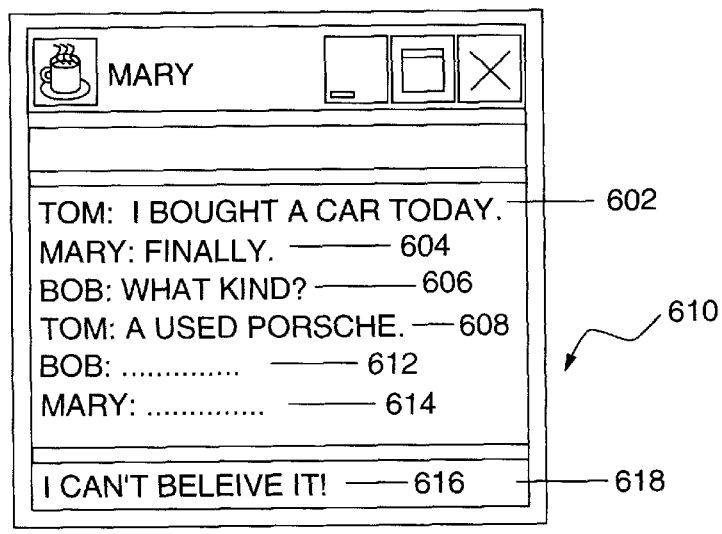
FIGURE 6B
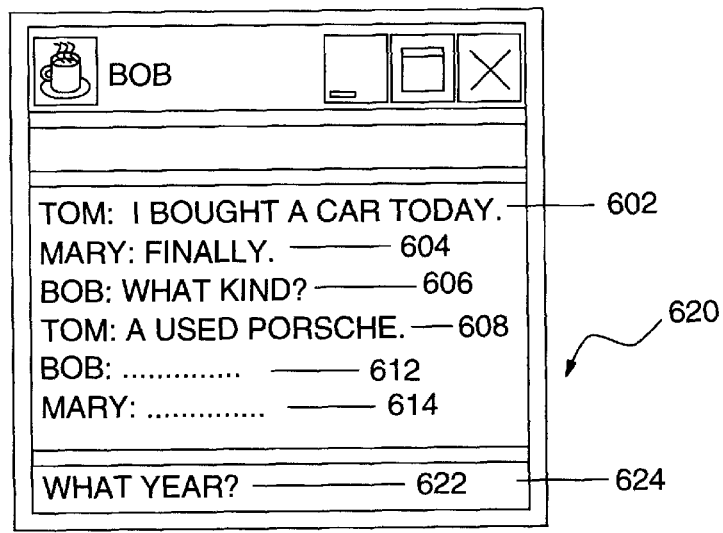
FIGURE 6C
FIG. 6

METHOD AND SYSTEM FOR EFFICIENT NETWORK DESIRABLE CHAT FEEDBACK OVER A COMMUNICATION NETWORK

FIELD OF THE INVENTION

This invention relates in general to a network interface and a communication process for chatting over a communication network, and in particular to a method and system for an improved Chat communication which provides a more efficient use of a heterogenous bandwidth over the Internet.

BACKGROUND OF THE INVENTION

Internet Service Providers (ISP's) such as America On Line and IRQ provide a Chat communication interface for their users to talk to each other over the Internet. IRQ estimates they have over 2.5 million users that use their Chat facility. There are many other ISPs competing in this area that also use Chat facilities.

Prior art comprises Chat facilities provided by ISPs. For currently existing Chat facilities, it is the quality and usability of the provided Graphical User Interface which is the main selling point that attracts customers to use a particular service. One service provider provides character-by-character feedback (ie., the receiver sees each character as soon as the sender types the character). An option is typically provided to turn this immediate feedback function off when network latency (time for information delivery) is great. Some services do not provide this function as a result of their overall network inefficiency (ie., current character-by-character feedback requires reliable (TCP/IP) communication which greatly increases the amount and frequency of data required to be delivered over the network). Additionally, this character-by-character feedback function may have undesirable effects because the receiver/addressee can see what the sender is typing before he/she has even decided whether or not to send the text, thereby severely limiting the sender's opportunity for reconciliation.

Thus, there is a need for a method and system which provides efficient network Chat feedback and which allows reconciliation by the sender before the actual text is viewable by the receiver.

SUMMARY OF THE INVENTION

Accordingly, one object of the present invention is to provide a method for Chat feedback to the receiver while still allowing the sender to have reconciliation ability.

Another object of the invention is to provide a network efficient method of chat feedback to the receiver.

Yet another object of the subject invention is to provide scaleability without assumptions which restrict the use of the communication system within certain types of networks.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIGS. 6A, 6B and 6C illustrate the present invention with multiple users;

DETAILED DESCRIPTION OF THE INVENTION

Figure 1:
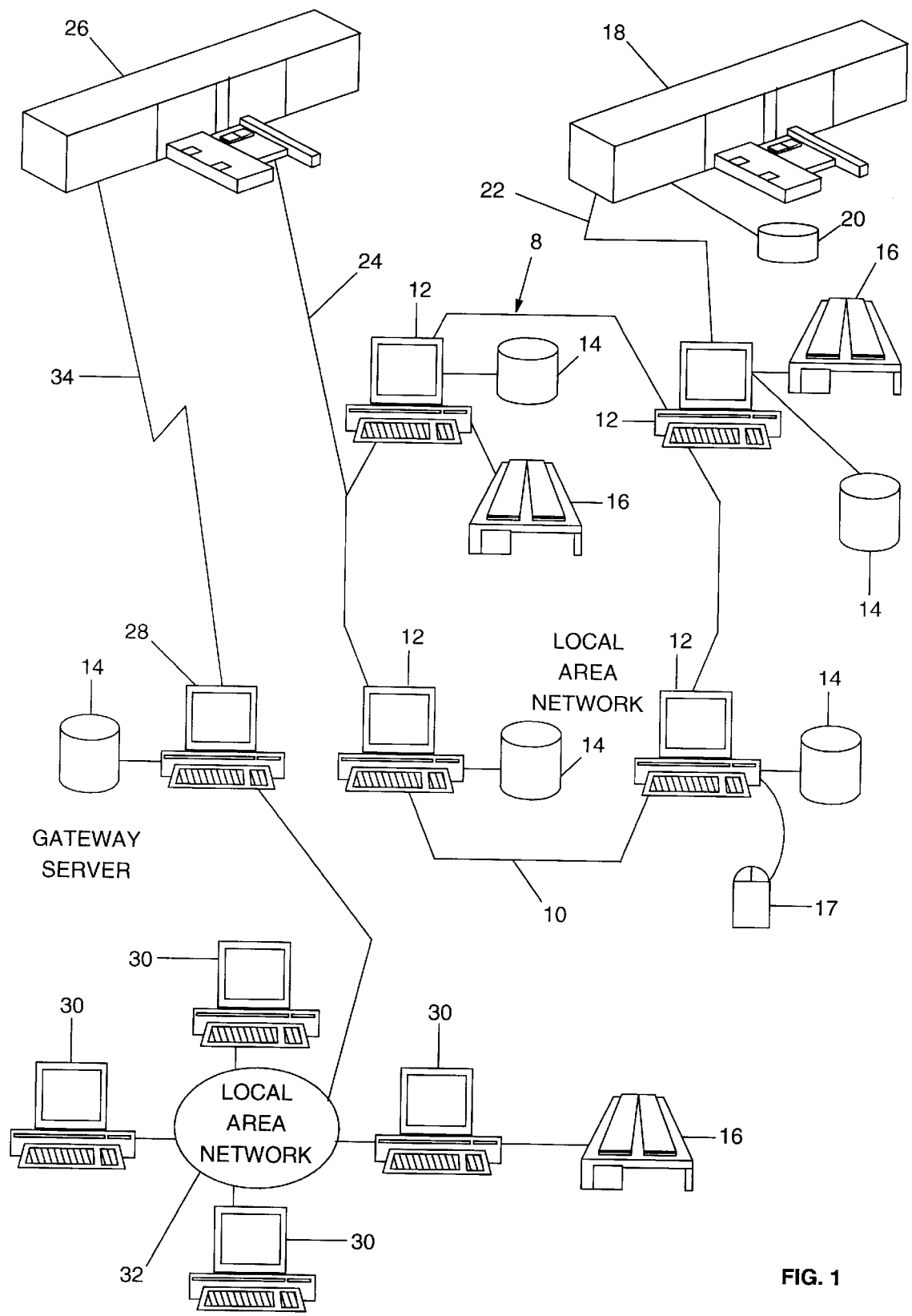
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
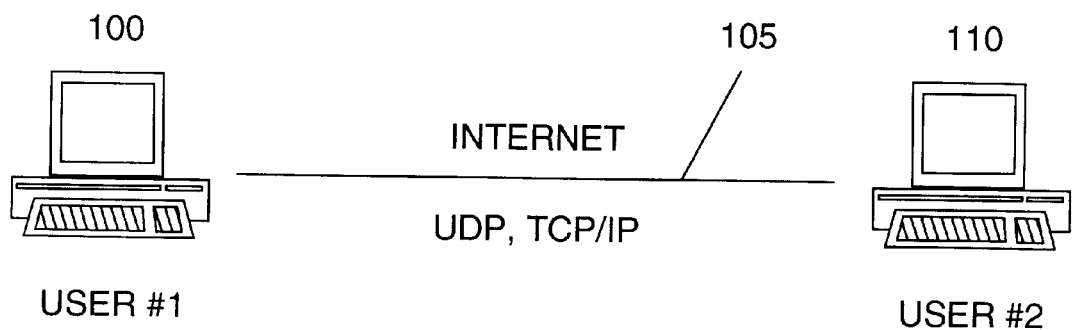
FIG. 2 is a graphical representation of an Internet Chat Environment.

Referring to FIG. 2, a graphical representation of a typical Internet Chat environment is shown. A User#1 at a terminal 100 has created a Chat session over the Internet 105 with a User#2 at a second terminal 110. In this example only, a total of two users are interconnected such that each can receive text (Chat) from the other. If User#1 types a text message, for example, "hello" and presses 'Enter' on the terminal 100 to send the text message, User#2 will receive the message on terminal 110. However, User#2 has no idea whether or not User#1 is in the process of sending any information until the completed message is received on terminal 110.

Figure 3:
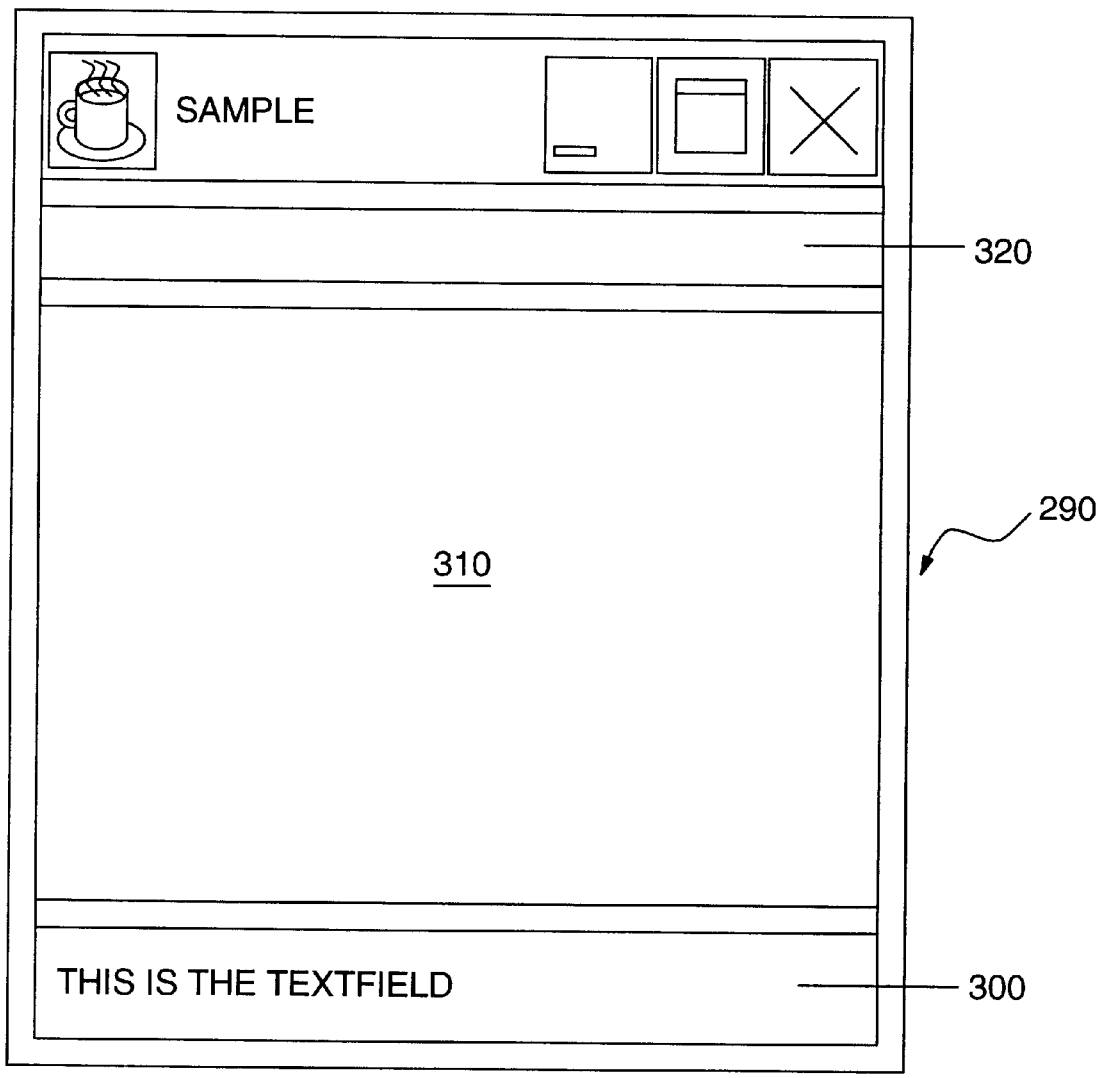
FIG. 3 is a pictorial representation of a sample Chat application in accordance with the present invention.

FIG. 3 illustrates a graphical representation of a sample Chat application, generally identified by reference numeral 290, constructed in accordance with the present invention. A textfield 300 is used to type text that will be sent to other users interconnected in the Chat session. A text window 310 displays any text received by a user. A receive window 320 is used to indicate text that is being typed by a sender. As a user is typing text in the textfield 300 to be sent to another user, the receiving user will see dots (or some other appropriate mask character) in their receive window 320 for each character that is typed. As the sender types and deletes characters the number of dots seen by the receiver in the receive window 320 will correspond to the number of characters in the sender's textfield 300. To implement multiple users in a chat environment the text window 310 can also be used as an extension to the receive window 320 to show text being typed (as indicated by the aforementioned dots) by each user before actually updating the receiver's text window 310 with the actual text.

Figure 4:
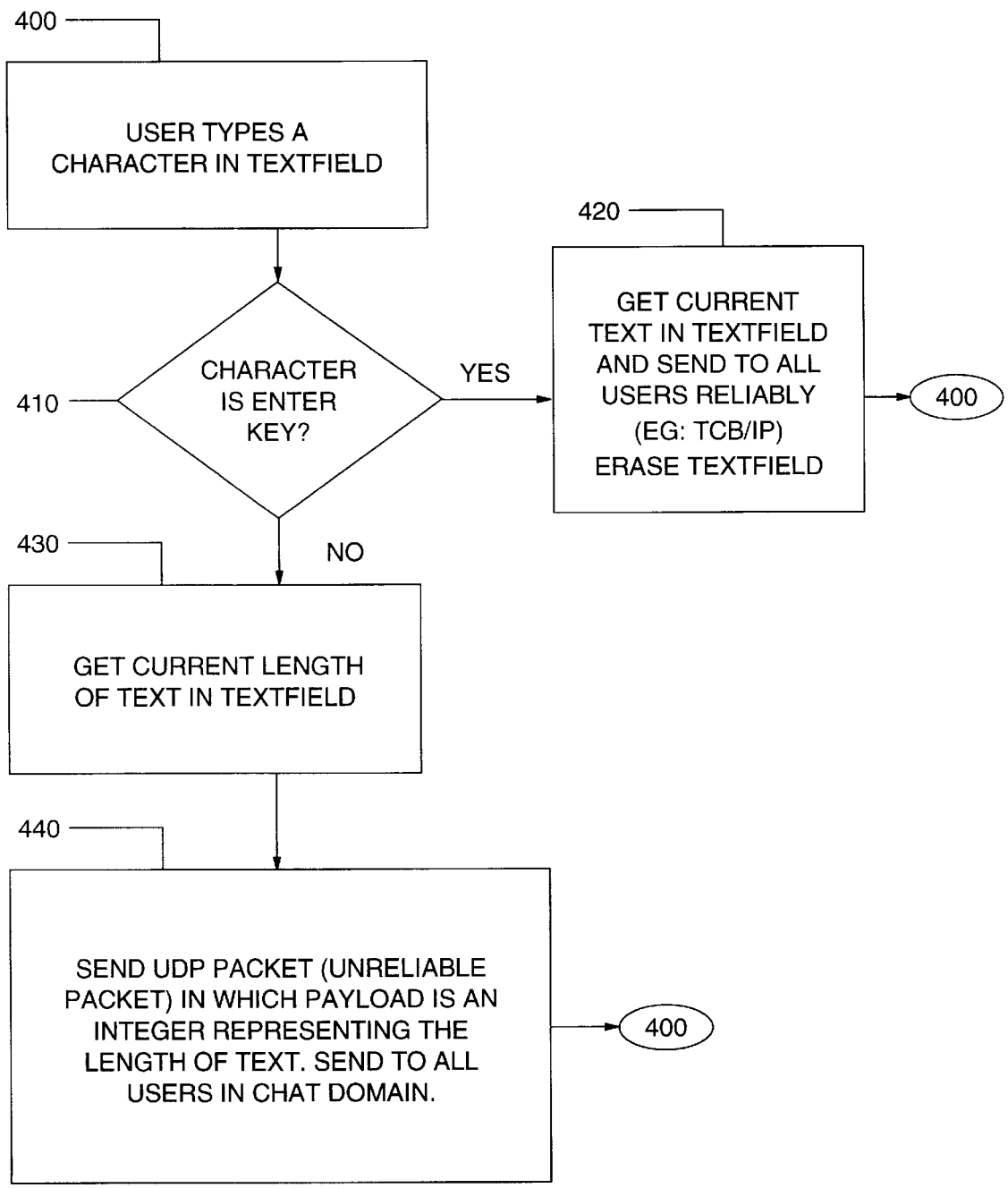
FIG. 4 is a flowchart illustrating the present invention in use at a sender facility.

Referring to FIG. 4, a flowchart illustrates the present invention process at the sender's location. At block 400, one user who intends to send data to another user types a character in a textfield 300 (see FIG. 3). It is then determined at decision block 410, whether or not this character is the 'Enter' key. If the response to decision block 410 is yes, the current text in the textfield 300 is sent at block 420 via reliable means (TCP/IP) to all users, and the textfield 300 is erased. The present invention then returns to block 400 to repeat the cycle.

If the response to decision block 410 is no, the present invention process gets the current length of the text in textfield 300 at block 430. At block 440, the present invention sends a UDP packet (an unreliable packet) that has a payload of an integer representing the length of the text (ie., an integer value equal to the number of typed characters). This packet is sent to all users in the Chat domain. The present invention process then returns to block 400 to repeat the cycle.

Figure 5:
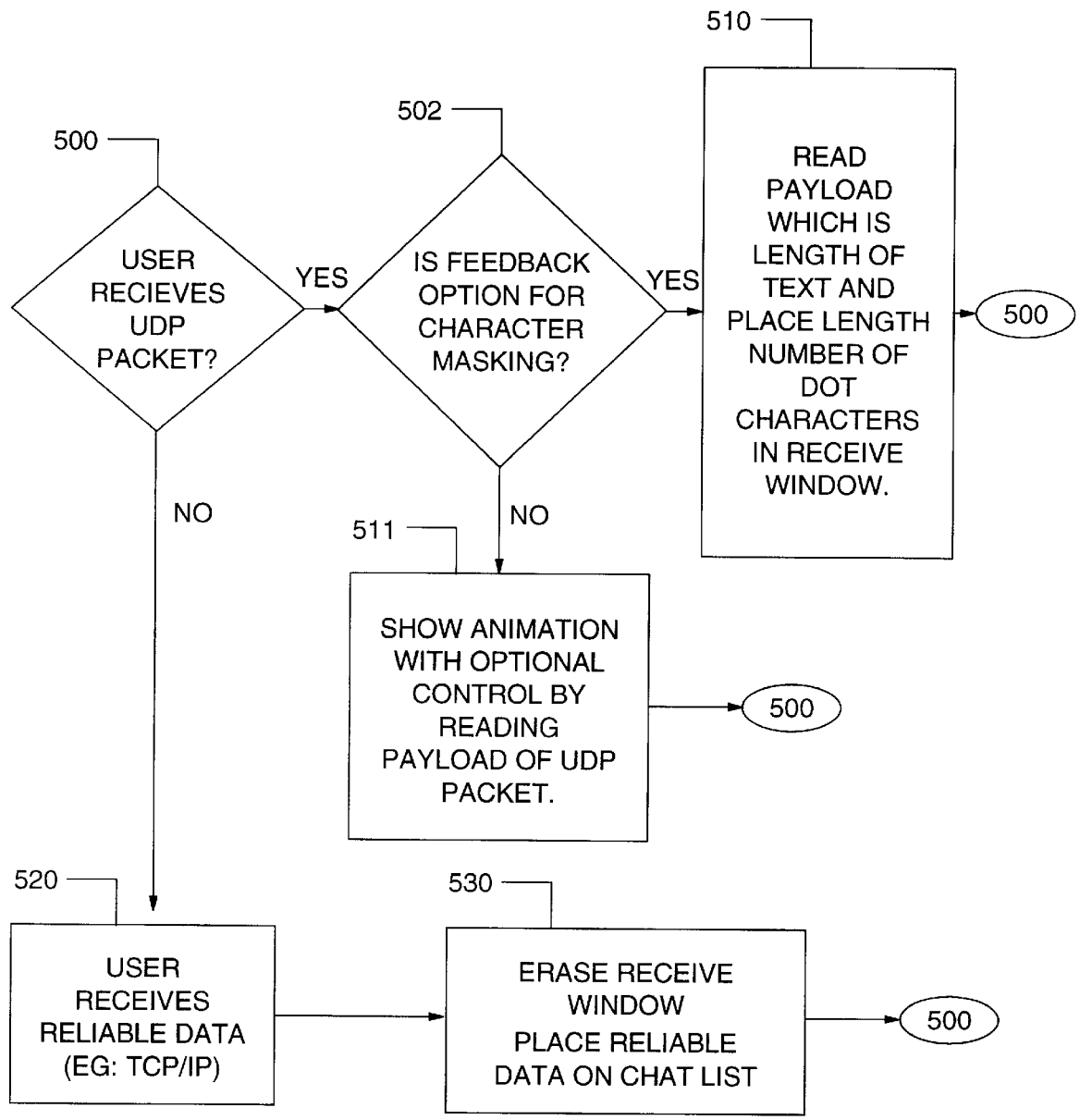
FIG. 5 is a flowchart illustrating the present invention in use at a receiver facility.

Referring to FIG. 5, a flowchart illustrates the present invention process at the receiver=s location. It is determined at decision block 500 whether or not a User who is receiving data from another user of the Chat session receives unreliable data (UDP packet). If the response to decision block 500 is yes (ie., a sender is typing text not yet ready for display to the receiver), it is determined at decision block 502 whether or not the packet is for the character masking feedback option. If the response to decision block 502 is yes, the payload, which is an integer value equal to the length of the text, is read at block 510, and the corresponding number of dot characters is placed (any previous data is overwritten) in the receiving user's receive window 320 (see FIG. 3). The present invention process then returns to decision block 500.

If the response to decision block 502 is no, animation may be shown with optional control by reading payload of UDP packet at block 511. This alternative embodiment to the preferred embodiment, as per the yes branch off decision block 502, provides the receiver with a display of some type of glypth or animation to represent the in-progress typing of a sender. One possible animation, for example only, could be the display of a pen appearing to write across the receiver's receive window 320. The present invention process then returns to decision block 500 to repeat the cycle.

If the response to decision block 500 is no, then, at block 520, the user has received reliable data (ie., text for which the sender has used the 'Enter' key sent via, for example, TCP/IP). At block 530, the dots in the receive window 320 are erased, and the reliable data (sent text) is entered in the Chat text window 310 (see FIG. 3). The present invention process then returns to decision block 500 to repeat the cycle.

Unreliable packets are used to send an indication of an answer being prepared (dots or animation) to receivers. The present invention allows the loss of any packets to negligibly effect the intent to show Chat in progress. If a packet is lost, the receiver will not see the correct current length of dots, but, if another subsequent packet is received, the effect is similar to the length jumping as if fast typing/deleting were occurring. In addition, multiple packets can be sent to reduce the possibility of loss without any effect to the displaying of the correct length of dots. Additionally, the use of UDP greatly reduces the load on the Internet which may be caused through the use of TCP/IP to show actual text being typed, as in the prior art. Reliable and unreliable alternative communication protocols can be applied and still fall within the scope of the present invention. Alternatively, the full sender's text with dots substituted for characters could be sent instead of an integer value equal to the length of the text, however, such a process, though an improvement over the prior art, is not as efficient as the preferred embodiment, as described above.

Referring to FIGS. 6A, 6B and 6C, a graphical representation of the present invention with multiple users sending Chat back-and-forth is illustrated. Three users are shown in Tom's Chat application, generally identified by reference numeral 600. An ongoing conversation is in progress, and it can be seen that Tom sent an initial message 602 ("I bought a car today.") to Mary's Chat application 610 and Bob's Chat application 620. Mary has replied with a message 604 ("Finally."), and Bob has replied with a message 606 ("What kind"). In response to Bob's message 606, Tom replied with another message 608 ("A used Prosche"). Then, as can be seen at lines 612 and 614 in FIGS. 6A, 6B and 6C, the presnt invention provides an indication that both Bob and Mary are preparing responses to Tom's message 608. As Mary prepares her response 616 in a textfield 618 of the application 610, she sees the the actual message ("I can't believe it"), while Tom and Bob see only the dots in line 614. Similarly, as Bob prepares his response 622 in a textfield 624 of the application 620, he sees the actual message ("What year"), while Tom and Mary see only the dots in line 612. Thus, each user in the network knows when another user is responding, yet, does not know what the actual message is until the sender hits the "Enter" command.

Figure 7:
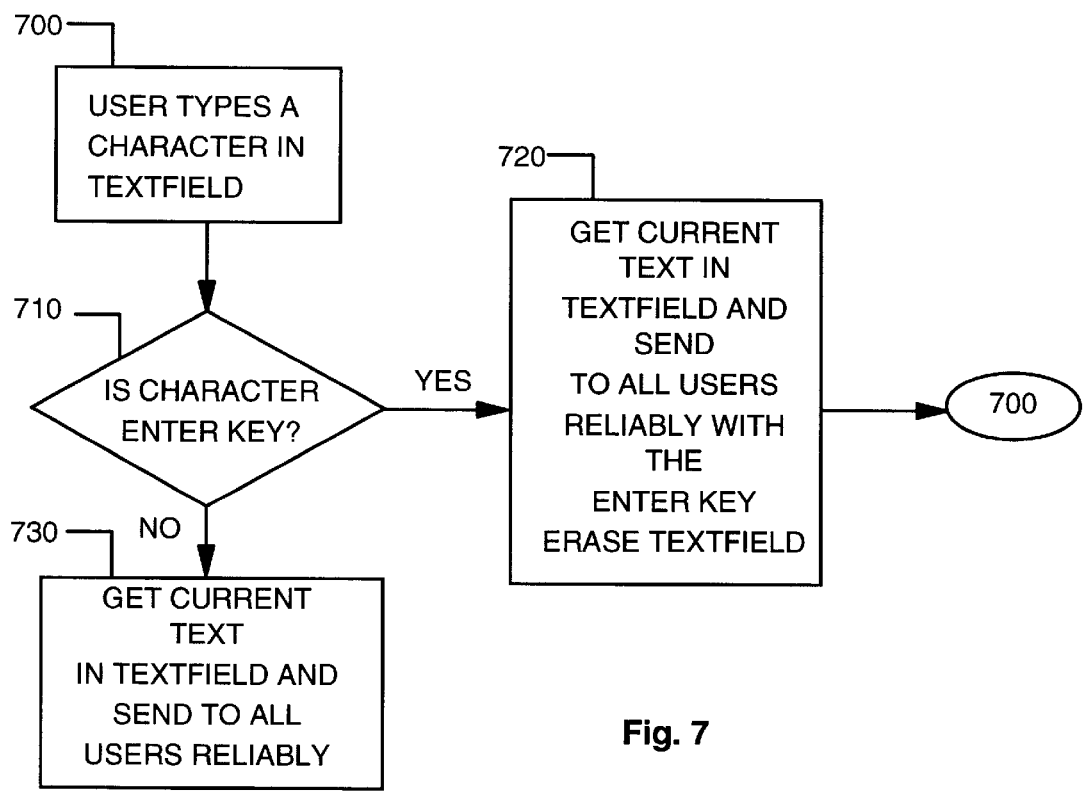
FIG. 7 is a flowchart illustrating an alternate embodiment of the present invention in use at a sender facility.
Figure 8:
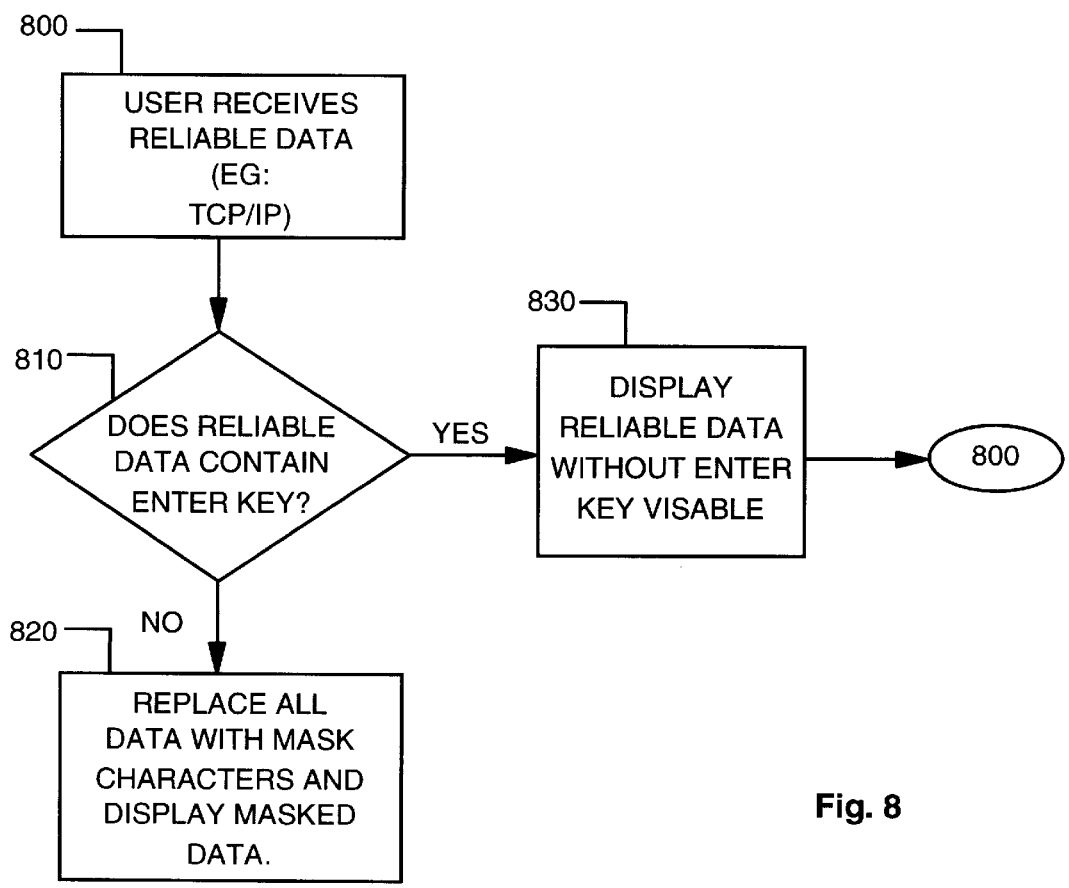
FIG. 8 is a flowchart illustrating an alternate embodiment of the present invention in use at a receiver facility.

A still further alternative embodiment is shown in FIGS. 7 and 8. In this embodiment, text is always sent to all receivers as it is typed by the sender, as per the prior art. However, in order to maintain the ability to correct the text before it is displayed to the receivers, the receiver's data processor displays mask characters instead of the actual text until an 'Enter' command is also received from the sender. Referring to FIG. 7, a flowchart illustrates the present invention process at the sender's location. In block 700, the user types a character into the textfield 300 (see FIG. 3). It is then determined at decision block 710 whether or not the character is the 'Enter' key. If the response to decision block 710 is yes, the current text in the textfield 300 is obtained and sent to all users reliably (ie., TCP/IP) along with the 'Enter' key, and the sender's textfield 300 is erased at block 720. If the response to decision block 710 is no, the current text in the textfield 300 is obtained and sent to all users reliably (without the 'Enter' key) at block 730. Subsequent to block 720 or block 730, the present invention process returns to block 700 to repeat the cycle.

Continuing with the same embodiment, FIG. 8 illustrates a flowchart of the present invention process at the receiver's location. The receiver receives reliable data (TCP/IP) at block 800. It is then determined at decision block 810 whether or not the reliable data contains the 'Enter' key. If the response to decision block 810 is yes, the reliable data is displayed in the receiver's Chat text window 310 ("Enter" key is not shown) at block 830. If the response to decision block 810 is no, all the reliable data is replaced with mask characters and masked data is displayed at block 820. Subsequent to block 820 or 830, the present invention process returns to block 800 to repeat the cycle. Thus, this embodiment masks the reliable data received until the sender is finished with his/her entry and hits the 'Enter' key.

A simple Java program that demonstrates the present invention to a single user chatting with himself is shown below:

```
/**
 * This implements the Improved Chat interaction Algorithm
 * UDP packets are used to send the length of text typed by the
 * sender. The receiver will receive the UDP packet which indicates
 * the length of dots to set in the text area.
 * This is a self connected program to demonstrate the Algorithm
 * Author: Richard Redpath 4 October 1997
 */
import java.awt.*;
import java.net.*;
import java.io.*;
import java.awt.event.*;
public class ChatSample
    implements ActionListener,
        KeyListener,
        Runnable {
TextField    results;
List     list;
DatagramSocket wsock=null;
DatagramSocket rsock=null;
public ChatSample(TextField tf, List list) {
    results=tf;
    this.list=list;
    try {
       wsock = new DatagramSocket(); //would use same port for
       rsock = new DatagramSocket(5001); // read/write but bug in 1.02
       new Thread(this).start();
    }catch (Exception e){
    }
    new Thread(this).start();
}
public void run() {
    byte b[]= new byte[10];
    DatagramPacket    dp = new DatagramPacket(b,b.length);
    ByteArrayInputStream in = new ByteArrayInputStream(b);
    DataInputStream    dinput= new DataInputStream(in);
    while (true) {
       try {
          in.reset();
          dp = new DatagramPacket(b,b.length);//we have too in V1.02
          rsock.receive(dp);
          int value =dinput.readInt();
          String string=new String();
          for (int i=0; i<value; i++)
             string+=".";
          results.setText(string);
       }catch (Exception e) {
          //termination
          break;
       }
    }
}
private void send(String string ) {
    try {
       ByteArrayOutputStream out = new ByteArrayOutputStream(10);
       DataOutputStream doutput= new DataOutputStream(out);
       out.reset();
       doutput.writeInt(string.length());
       DatagramPacket dp = new DatagramPacket(out.toByteArray(),out.size(),
              InetAddress.getLocalHost(),
```

```
                5001);
        wsock.send(dp);
    }catch (Exception e) {
    }
}
/**
* TCP send done here but for now update yourself here
*/
public void actionPerformed(ActionEvent e) {
    System.out.println("action");
    TextField from= (TextField)e.getSource();
    list.addItem(from.getText());
    from.setText("");
}
public void keyTyped(KeyEvent e) {
}
public void keyPressed(KeyEvent e) {
}
/**
* UDP send done here
*/
public void keyReleased(KeyEvent e) {
    TextField from = (TextField)e.getSource();
    send(from.getText());
}
public static void main(String args[]) {
    TextField tf=new TextField();
    List list =new List();
    ChatSample s = new ChatSample(tf,list);
    Frame    f = new Frame("sample");
    f.setLayout(new BorderLayout());
    f.add("South",tf);
    f.add("Center",list);
    f.add("North",tf=new TextField());
    tf.addActionListener(s);
    tf.addKeyListener(s);
    f.setBounds(10,10,250,400);
    f.show();
    }
}
```

Although the present invention has been described with respect to a specific preferred embodiment thereof, various changes and modifications may be suggested to one skilled in the art and it is intended that the present invention encompass such changes and modifications as fall within the scope of the appended claims.

What is claimed:

1. A method of providing feedback in a network chat environment, comprising the steps of:

creating sender data on at least a first chat client on the network chat environment;

checking said sender data for presence of an enter key command;

if said enter key command is not detected, sending an unreliable data packet comprising at least one mask character corresponding to said sender data; and displaying said at least one mask character corresponding to said sender data on at least a second chat client on the network chat environment, wherein said at least a second chat client is provided with feedback as to creation of said sender data as said sender data is being created on said at least a first chat client.

2. The method of claim 1, wherein said step of displaying at least one mask character comprises displaying sender text length data.

3. The method of claim 1, wherein said step of displaying at least one mask character comprises displaying sender text represented by a glypth.

4. The method of claim 1, wherein each one of a plurality of displays of said at least one mask character, respectively, represents each one of a plurality of senders currently typing in the chat environment.

5. A system for providing feedback in a network chat environment, comprising:

means for creating sender data on at least a first chat client on the network chat environment;

means for checking said sender data for presence of an enter key command;

if said enter key command is not detected, means for sending an unreliable data racket comprising at least one mask character corresponding to said sender data; and means for displaying said at least one mask character corresponding to said sender data on at least a second chat client on the network chat environment, wherein said at least a second chat client is provided with feedback as to creation of said sender data as said sender data is being created on said at least a first chat client.

6. The system of claim 5, wherein said means for displaying at least one mask character comprises means for displaying sender text length data.

7. The system of claim 5, wherein said means for displaying at least one mask character comprises means for displaying sender text represented by a glypth.

8. The system of claim 5, wherein each one of a plurality of displays of said at least one mask character, respectively, represents each one of a plurality of senders currently typing in the chat environment.

9. A computer program product recorded on computer readable medium for providing feedback in a network chat environment, comprising:

computer readable means for creating sender data on at least a first chat client on the network chat environment;

computer readable means for checking said sender data for presence of an enter key command;

if said enter key command is not detected, computer readable means for sending an unreliable data packet comprising at least one mask character corresponding to said sender data; and computer readable means for displaying said at least one mask character corresponding to said sender data on at least a second chat client on the network chat environment, wherein said at least a second chat client is provided with feedback as to creation of said sender data as said sender data is being created on said at least a first chat client.

10. The program product of claim 9, wherein said computer readable means for displaying at least one mask character comprises computer readable means for displaying sender text length data.

11. The program product of claim 9, wherein said computer readable means for displaying at least one mask character comprises computer readable means for displaying sender text represented by a glypth.

12. The program product of claim 9, wherein each one of a plurality of displays of said at least one mask character, respectively, represents each one of a plurality of senders currently typing in the chat environment.

* * * * *